United States Patent
Elm

[11] 3,810,596
[45] May 14, 1974

[54] FLEXIBLE BASE FOR CABLE TIE
[75] Inventor: Robert A. Elm, Saint Paul, Minn.
[73] Assignee: Minnesota Mining and Manufacturing Company, St. Paul, Minn.
[22] Filed: May 16, 1972
[21] Appl. No.: 253,829

[52] U.S. Cl....... 248/74 PB, 248/205 A, 248/361 A
[51] Int. Cl............................................. F16l 3/08
[58] Field of Search ........... 248/74 PB, 74 B, 68 R, 248/467, 205 A, 361 A; 24/73 PB, 73 AP, 206 R, 16 PB, 3 R

[56] References Cited
UNITED STATES PATENTS

| 3,454,249 | 7/1969 | Geisinger | 248/74 PB X |
|---|---|---|---|
| 3,542,321 | 11/1970 | Kahabka | 248/74 PB X |
| 3,084,407 | 4/1963 | Settles | 24/3 R |
| 3,098,272 | 7/1963 | Frye | 248/205 A X |
| 2,597,555 | 5/1952 | Widder | 24/206 R X |
| 3,556,575 | 1/1971 | Farkas | 24/16 PB X |
| 3,672,615 | 6/1972 | Fiorentino | 249/74 PB |
| 3,409,257 | 11/1968 | Elm | 248/205 A X |

OTHER PUBLICATIONS

Bulletin PT-2, Panduit Pan-Ty Locking Cable Ties, 1971, pg. 7, "Full Line of Mounting Devices for Pan-Ty ... Cable Ties".

Primary Examiner—Roy D. Frazier
Assistant Examiner—Rodney H. Bonck
Attorney, Agent, or Firm—Alexander, Sell, Steldt & Delahunt

[57] ABSTRACT

A flexible base for a cable tie, made by a simple extruding, cutting and shaping operation, serves as an inexpensive but fully effective means for adherently fastening the strap-like cable tie to flat or rounded structural surfaces.

5 Claims, 5 Drawing Figures

PATENTED MAY 14 1974   3,810,596
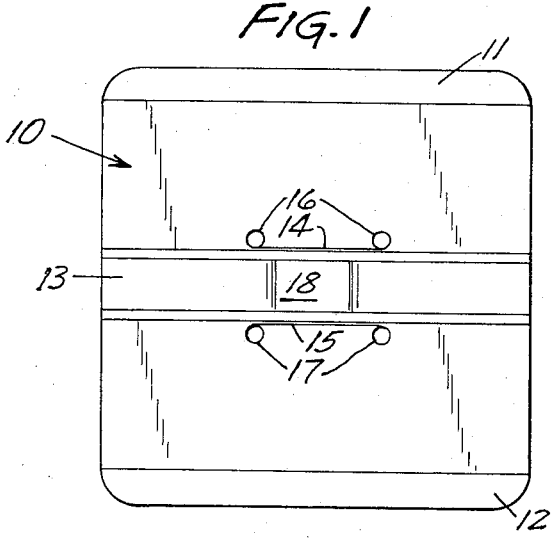
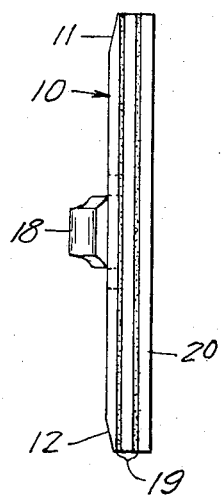
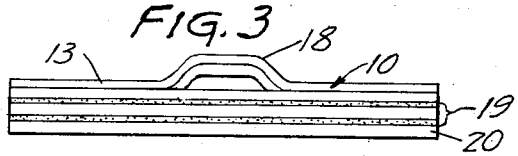
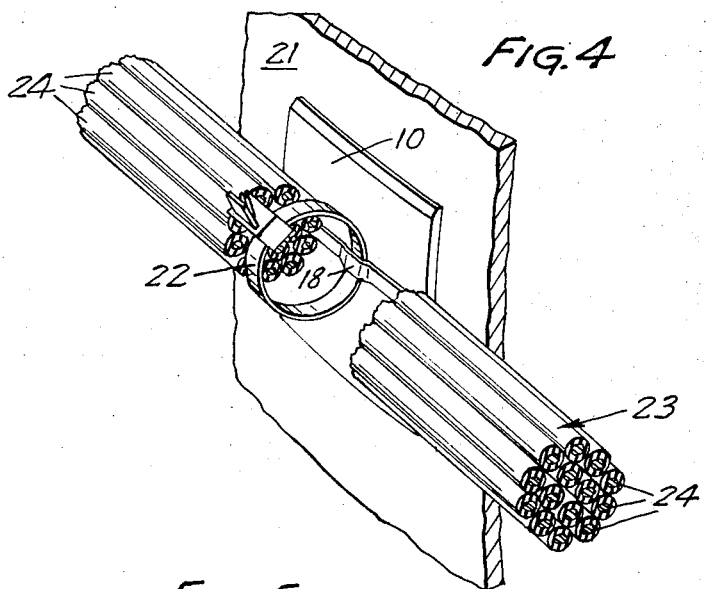
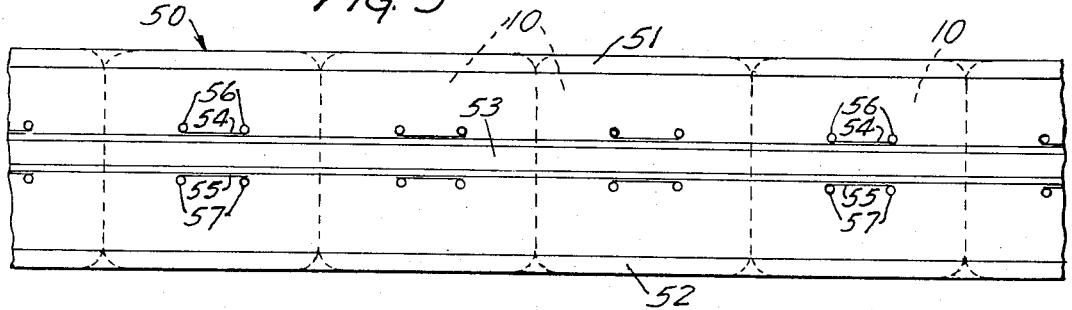

FLEXIBLE BASE FOR CABLE TIE

This invention relates generally to the fastening of wire-bundles or the like to structural surfaces, and more particularly to flexible bases or pads for cable ties which permit adhesive bonding to curved or rounded surfaces. An important field of utility is in the placing of wire-bundles in the wiring of automobiles and aeroplanes, where the strap or tie must be supported against a convexly or concavely curved metal panel and where screw type fastenings must be avoided.

A popular form of tie is described in U.S. Pat. No. 3,542,321. It includes a serrately toothed strap member terminating in a strap-receiving loop having a strap-securing pawl fitted with a release lever. The loop may include a substantially rigid base which may be adherently attached to flat wall, desk or other supporting surfaces; or a separate base, having a bridge structure designed to receive the strap-receiving loop, may be used instead. The bridge structure in particular is relatively thick and non-flexible, and its complicated shape requires the use of intricate and expensive molds for production thereof.

It has now been found possible to provide a greatly simplified and desirably flexible base for cable ties, and by methods requiring much less sophisticated tooling.

In accordance with one aspect of the invention, a suitably bridged flexible base or support for cable ties is produced by simple slitting and deforming of a flexible flat sheet material. The sheet in the form of a pad of suitable external dimensions is provided with two central parallel slits defining a central strip which remains attached to the sheet at both ends. The strip is then raised to form a low profile bridge beneath which the strap or tie may be inserted. A coating or film of adhesive applied over the reverse surface and covered with a removable protective liner then completes the structure.

Another aspect of the invention is concerned with the rapid and economical production of an improved form of the base or pad by a method involving continuous extrusion. The method involves extrusion of a shaped flat flexible strip of plastic material in elongate strip form, accompanied or followed by a sequence of stamping operations involving cutting and shaping to form the desired product.

In the drawing,

FIG. 1 is a top plan view and FIGS. 2 and 3 are edge views on a distorted scale for clarity of illustration, of a preferred form of pad or base, FIG. 4 is a view in perspective showing a tied wire-bundle supported on a structural surface by the pad of FIGS. 1–3, and FIG. 5 is a top plan view of a slit perforate extruded plastic strip material.

The pad 10 as illustrated is of square outline with rounded corners. Alternative shapes with rectangular, oval, circular or other outlines are equally effective but allow less efficient use of materials. Two opposing margins 11 and 12 are tapered to minimum thickness. A central broad flat ridge 13 with tapered edges, parallel to the tapered margins, is of substantially greater thickness than the remainder of the pad.

Parallel slits 14, 15 in the pad at the edges of the ridge 13 extend across the central portion of the pad between circular stress-relief openings 16, 16 and 17, 17 respectively to provide a central strip 18 which, as best illustrated in FIG. 3, is raised by lifting above the level of the upper surface of the pad 10 to form a low profile bridge structure. The plastic material readily accommodates the slight amount of stretch required to obtain the raised structure, without loss of strength.

A strip or pad of normally tacky and pressure-sensitive adhesive 19 is affixed to the flat under surface of the pad 10 and is covered with a removable protective liner 20.

FIG. 4 illustrates the pad 10, with the liner 20 removed, adhered to a convexly curved structural member 21 which may be the metal shell of an automobile body. A plastic strap or tie 22 passes beneath the bridge 18 and is snugly fastened about a bundle 23 of wires 24. The bundle is securely held in place.

The extruded thin plastic strip or band 50 of FIG. 5 represents a structure from which pads 10 of FIG. 1 are to be detached. It has a central raised ridge 53 between tapered edges 51, 52 and a series of spaced slits 54, 55 between perforations 56, 57 at opposite edges of the ridge 53. Dotted lines indicate the lines along which the band is to be severed in producing the individual pads 10 of FIG. 1.

In a specific illustrative but non-limiting example the pad 10 is 1.75 × 1.75 inches square. The flat portion is 0.012 inch in thickness, the ridged central portion is 0.020 inch in thickness and 0.250 inch in width. The perforations 16 are 0.062 inch in diameter and their center-to-center separation is 0.450 inch. The opposing perforations 16 and 17 are spaced apart a distance of 0.312 inch center-to-center. The connecting slits 14, 15 are separated a distance of 0.250 inch and terminate tangent to the corresponding perforations. A central section of the bridge 18 having a length of 0.150 inch, i.e., slightly more than the width of the tie which is to be inserted thereunder, remains parallel to the plane of the pad and its inner surface is at a height of about 0.05 inch above the plane of the top surface of the pad. The pad is formed of extrusion grade black nylon polyamide (DuPont Grade FE-2212). A conformable adhesive layer ("Scotch-Mount" adhesive tape No. 4432) consisting of a rubbery foam impregnated and coated over both surfaces with permanently tacky pressure-sensitive adhesive and having a total thickness of about 1/32 inch, is adhered to the flat lower surface and extends across the bridge opening. A sheet of silicone-coated paper liner covers the outer adhesive surface.

What is claimed is as follows:

1. A flexible base for a cable tie, comprising a generally rectangular thin flexible plastic pad not more than about 0.012 inch in thickness having a flat surface and an opposite surface having two opposing edges and a thickened central flat raised portion not more than about 0.020 inch in thickness forming a ridge parallel to said edges; a central length of said ridge being lifted above the level of said opposite surface to form a bridge for retaining a flexible cable tie; said pad being perforate at each of the four corners of said bridge; and a conformable adhesive layer affixed over the flat surface of said pad.

2. Flexible base of claim 1 wherein said pad is about 0.01 inch in thickness and said bridge is about 0.02 inch in thickness, and wherein said base is composed of nylon polyamide polymer.

3. Flexible base of claim 1 wherein is inserted within the opening between said bridge and said pad a cable tie strap.

4. An elongate thin strip of tough flexible polymeric plastic material having a flat surface and an opposite surface having opposing tapering edges and a thickened central flat raised portion forming a ridge parallel to said edges, said strip being not more than about 0.012 inch in thickness and being slit at periodic intervals along both edges of said ridge and being perforate at each end of each slit, and suitable for separation into segments, one for each said interval, to provide cable tie base members, said ridge being not more than about 0.020 inch in thickness.

5. Strip material of claim 4 having said ridge lifted above the level of said strip between slits at each of said intervals and having over said flat surface a pressure-sensitive adhesive.

* * * * *